N. F. NISSEN.
PASTEURIZING MACHINE.
APPLICATION FILED JUNE 30, 1909.
1,088,921.
Patented Mar. 3, 1914.
5 SHEETS—SHEET 1.
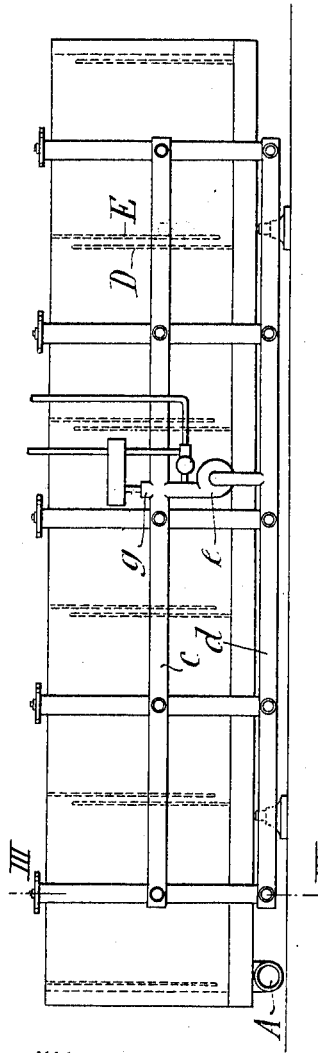
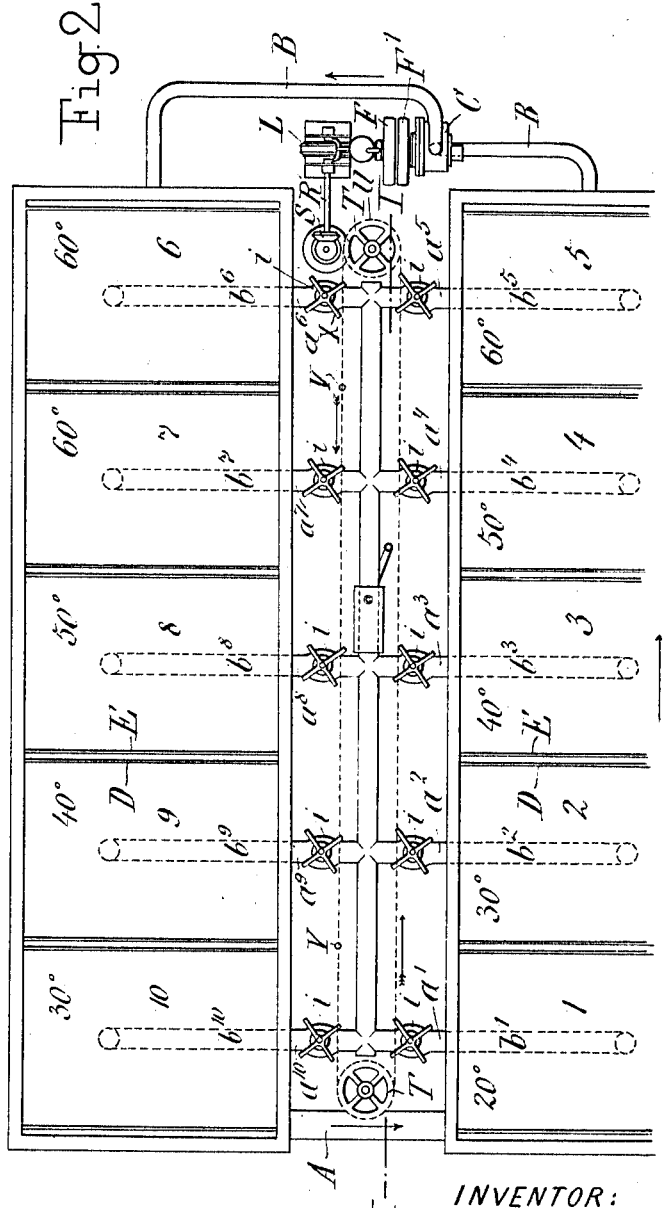
WITNESSES:
INVENTOR:
Niels Frederik Nissen,
By Attorneys,

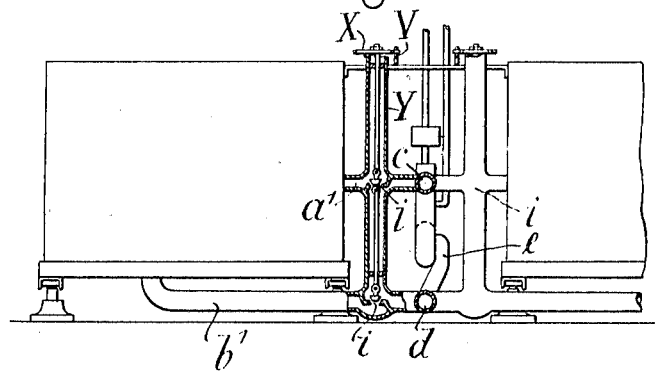
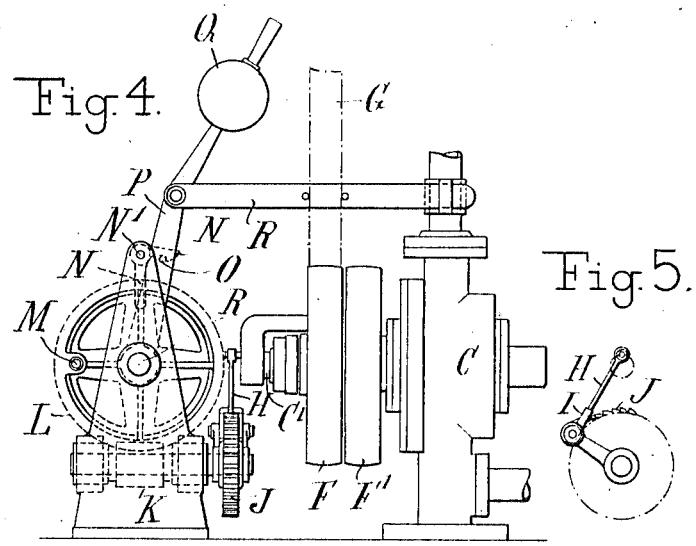

N. F. NISSEN.
PASTEURIZING MACHINE.
APPLICATION FILED JUNE 30, 1909.
1,088,921.
Patented Mar. 3, 1914.
5 SHEETS—SHEET 3.
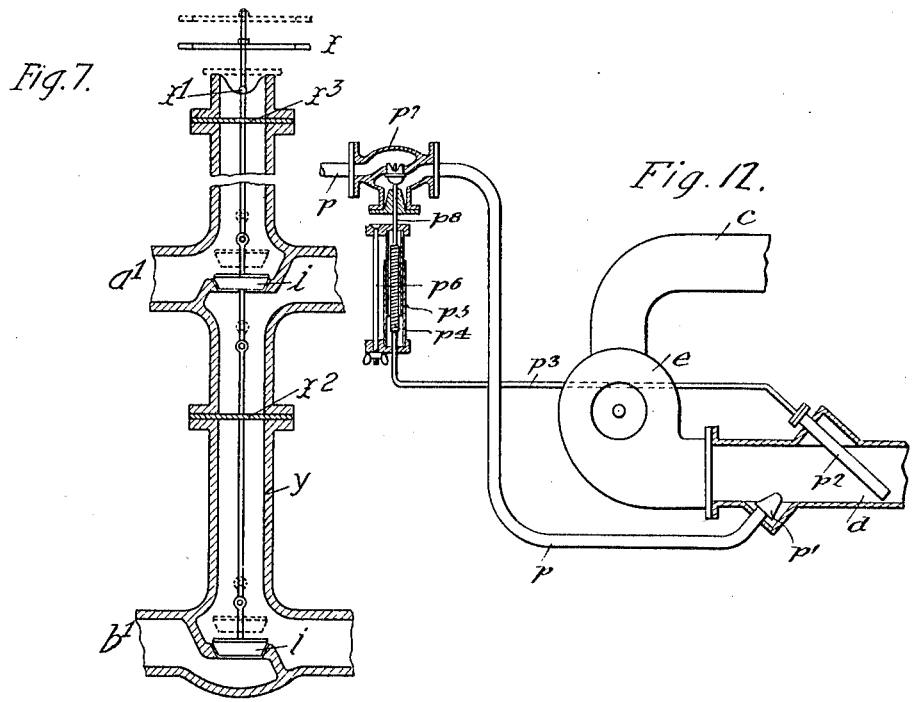
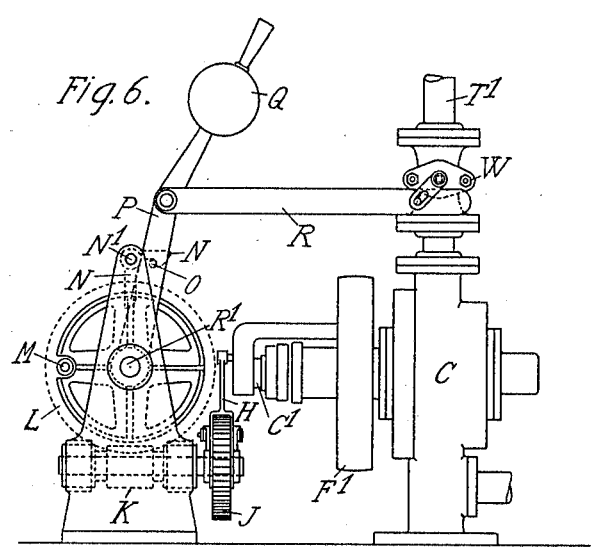
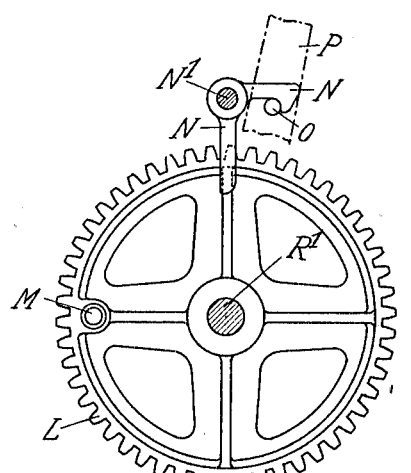
INVENTOR:
Niels Frederik Nissen,
By Attorneys, N. F. NISSEN.
PASTEURIZING MACHINE.
APPLICATION FILED JUNE 30, 1909.
1,088,921.
Patented Mar. 3, 1914.
5 SHEETS—SHEET 4.
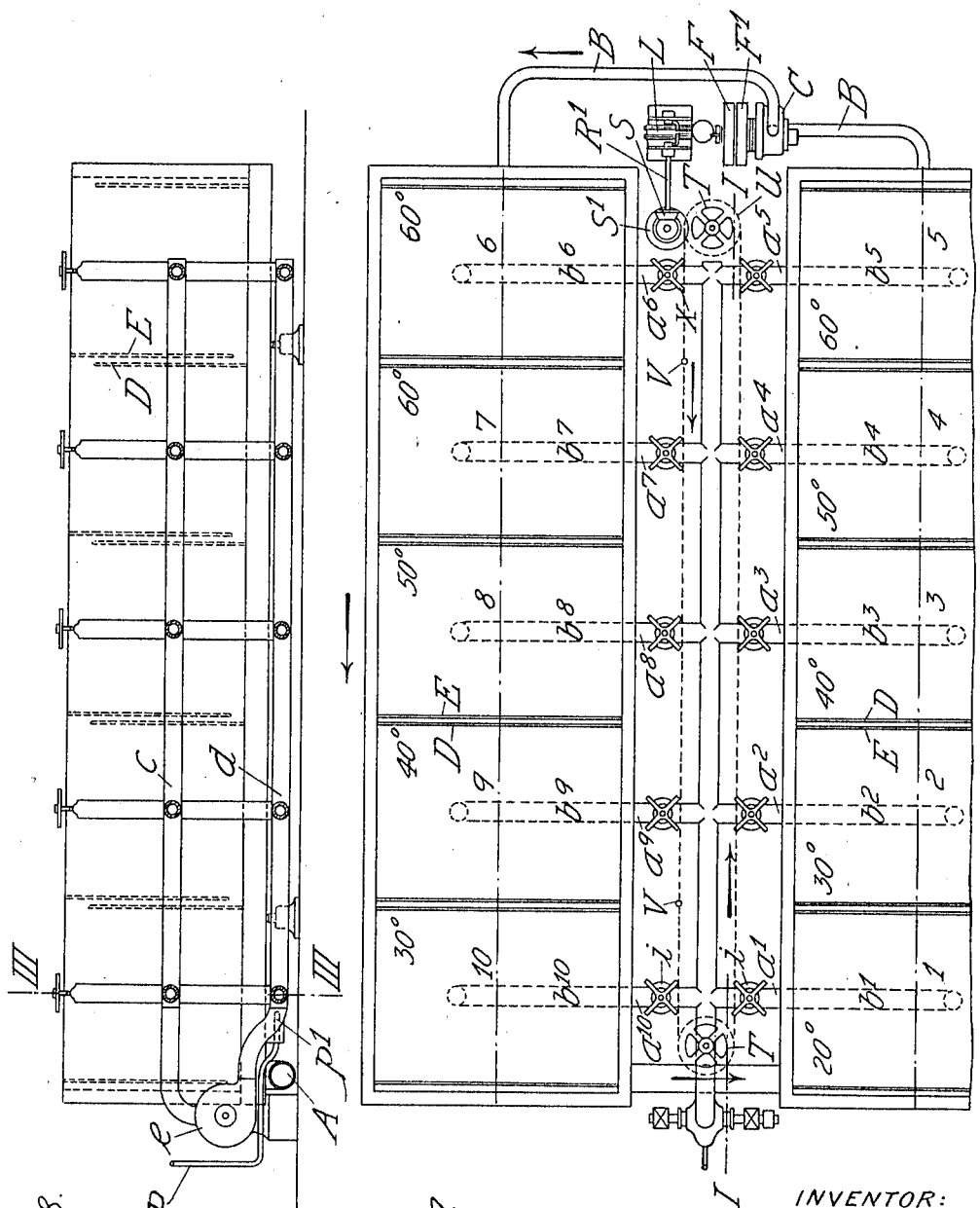
INVENTOR:
Niels Frederik Nissen
By Attorneys, N. F. NISSEN.
PASTEURIZING MACHINE.
APPLICATION FILED JUNE 30, 1909.
1,088,921.
Patented Mar. 3, 1914.
5 SHEETS—SHEET 5.
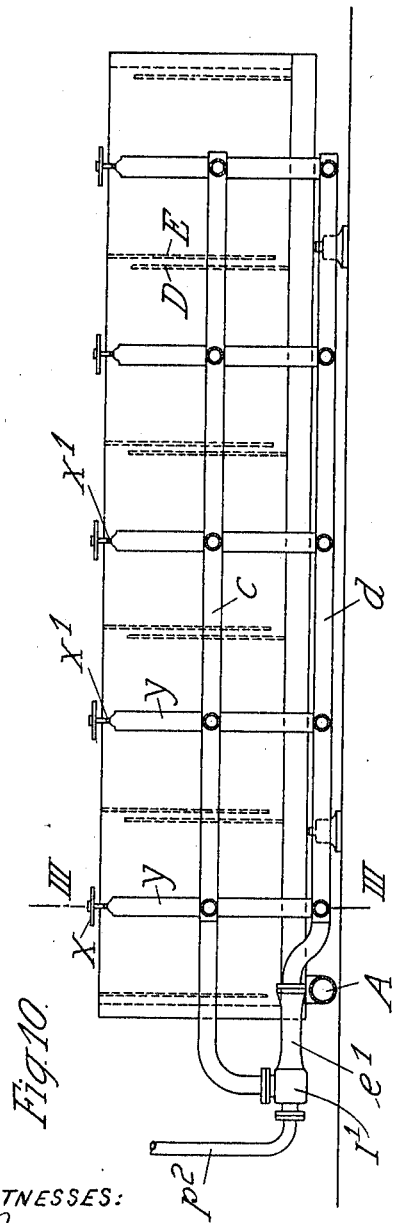
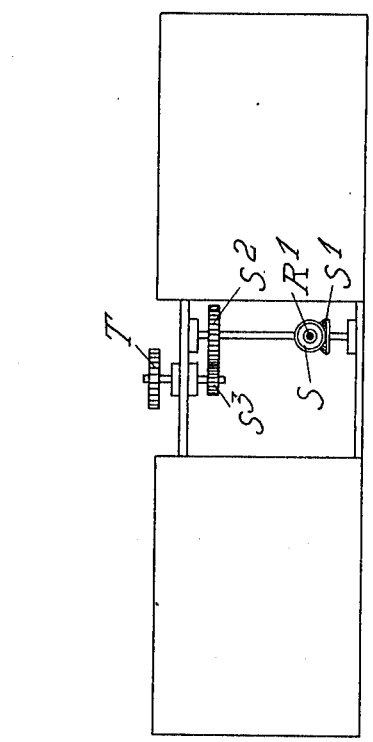
WITNESSES:
INVENTOR:
Niels Frederik Nissens
By Attorneys,

UNITED STATES PATENT OFFICE.

NIELS FREDERIK NISSEN, OF COPENHAGEN, DENMARK, ASSIGNOR TO NYEBOE & NISSEN, OF COPENHAGEN, DENMARK, A FIRM.

PASTEURIZING-MACHINE.

1,088,921.   Specification of Letters Patent.   Patented Mar. 3, 1914.

Application filed June 30, 1909. Serial No. 505,296.

*To all whom it may concern:*

Be it known that I, NIELS FREDERIK NISSEN, engineer, residing at Raadhuspladsen 37, Copenhagen, Denmark, have invented new and useful Improvements in Pasteurizing-Machines, of which the following is a specification.

The object of the present invention is an improvement in the kind of pasteurizing apparatuses characterized in that the receptacles containing the goods to be pasteurized are submerged in liquid in a series of intercommunicating chambers, the temperature of the liquid in the several compartments being successively greater up to a predetermined maximum and then successively less down to a predetermined minimum. The liquid in the compartments is then circulated and the liquid of varying temperatures in the several compartments is transferred from one compartment to another, each compartment thereby having passed therethrough liquid of a temperature from the minimum to the maximum and again to the minimum. The receptacles to be pasteurized are successively placed in the chambers wherein is contained liquid of the lowest temperature, as the liquid is transferred from one chamber to the next, and the receptacles are left therein until the liquid of lowest temperature again reaches the successive chambers, when the receptacles are taken out and replaced by new receptacles to be pasteurized.

The invention consists in the provision of a device adapted to arrest automatically, at the proper moment, the circulation of the heat transmitting fluid, and to maintain, automatically, the proper thermic state of this fluid thereby that heat is supplied to the proper pasteurizing chambers. Hereby it is attained that the person operating the apparatus has no other duty than to exchange, at certain time intervals, the receptacles containing the goods, and thereafter to restart the fluid circulation, while all the other work is performed automatically by the machine itself. This is attained by providing means to arrest the circulation automatically, whenever the pump or other fluid moving device has caused the fluid contents of the chamber to advance one chamber, and by providing means for letting the necessary supply of heat to the hottest chambers be governed by the periodic action of the pump.

On the accompanying drawings Figure 1 represents a vertical section along line I—I of Fig. 2, Fig. 2 is a top-view of the apparatus, Fig. 3 a vertical section along the line III—III, Fig. 1, Fig. 4 the pump producing the circulation of the heat transmitting fluid, and Fig. 5 a detail belonging to the arresting mechanism of the pump. Fig. 6 shows an arrangement, which automatically closes the valve on the pressure pipe of the pump when the circulating pump has made the stipulated number of revolutions. Fig. 6$^a$ represents a detail of the shifting device, shown in Figs. 4 and 6. Fig. 7 represents a detail in vertical section. Figs. 8 and 9 show the apparatus fitted with steampipe, pump and nozzle. Fig. 10 represents the apparatus fitted with an injector and a steampipe, and Fig. 11 is a detail. Fig. 12 is a detail illustration of the means for heating the fluid and its thermostatic controlling means.

The apparatus consists of two tanks, divided by double partitions D and E into ten chambers 1–10. The intercommunication between any two adjoining chambers is effected by one of the partitions D not quite reaching the top of the tank, while the other partition E not quite reaches the bottom of the tank. Besides the chambers 1 and 10 are connected by means of a pipe A, and the chambers 5 and 6 are connected by means of a pipe B and the pump C, so that a continuous circuit is provided through all the chambers and the pump C.

The heat transmitting medium in the various chambers is supposed to have, at a given moment, the temperatures indicated on the drawing. After the receptacles in the coldest chamber 1 have been exchanged, the fluid in a known manner is caused to circulate, in direction of the arrow, sufficiently to bring the inscribed temperatures one chamber forward. At the same time sufficient heat, from an exterior source, is added to the pasteurizing chambers proper 5, 6 and 7 in order to maintain them at the proper pasteurizing temperature, say 60°. After the receptacles in chamber 2 which is now at the lowest temperature 20°, are exchanged, the fluid is again advanced, by means of the pump, until the temperatures have again been transferred one chamber forward, etc., in other words the goods to be pasteurized are first exposed to increasing temperatures, then they are kept for some time at the actual pasteurizing temperature, and finally they are exposed to gradually decreasing temperatures.

The stoppage of the motion of the fluid, after it has made the proper advance, may be effected, for instance, by the pump being stopped after having made a certain number of revolutions or a certain number of strokes or by a valve or cock being caused to close. Fig. 6 represents, by way of example, a device to this effect. When the wheel L has been turned so far, that the projection M strikes against the lever N, then the latter will be raised so as to release the pin O, whereupon the counterweight Q will force the rod R to move to the right. This rod is connected to the cockplug, which is consequently turned.

In Fig. 4 is shown, by way of example, a rotary pump C driven by a belt G acting on a fixed pulley F and a loose pulley F'.

Eccentrically on the pump shaft C' is journaled a fork-shaped connecting rod H (see Fig. 5) carrying a pawl I which engages a ratchet wheel J on whose shaft is keyed a worm K engaging a worm-wheel L fitted with a striking pin M. The gearing is such that when the pump has made a certain number of revolutions, corresponding to the proper volume of water to be moved forward, the wheel L will have finished one revolution. The pin M then strikes the lower part of the angular hook N, hanging on its pin N', and thereby releases the stud O fastened on the disconnecting lever P. This latter now sinks down, by action of its counterweight Q, and moves the bar R which then shifts the belt G from the fixed pulley F to the loose pulley F', thereby stopping the pump. The lever P, instead of moving the belt shifter might be used (as shown in Fig. 6) to operate a valve or cock shutting off the flow of water through the pump which latter would then run idle.

The parts of the ratchet mechanism H I J may be so proportioned as to allow the pump C to make a larger or smaller number of revolutions, before the circulation is stopped.

The adjustment of temperatures in the hottest chambers is effected by means of the device represented in Figs. 1, 2, 3, 8, 9 and 12. Each of the chambers communicates at top through a pipe $a^1$–$a^{10}$ with a main pipe $c$, and at bottom through a pipe $b^1$–$b^{10}$ with another main pipe $d$. The branch pipes $a^1$–$a^{10}$ and $b^1$–$b^{10}$ are fitted with puppet valves $i$ (Fig. 3) connected in such a manner that the upper valve belonging to any one chamber opens and closes simultaneously with the opening and closing of the valve below it. The upper main pipe $c$ and the lower main pipe $d$ are connected by means of a pump $e$, into the outlet of which steam is introduced through a steam pipe $p$ and a nozzle $p^1$. This pump may be of any known construction.

Fig. 8 further shows by way of example a rotary pump $e$ fitted with a steam pipe $p$ and nozzle $p^1$, while in Fig. 10 is represented an injector pump $I^1$ having an injector $e^1$ and a steam pipe $p^2$. Any injector of known construction will answer the purpose. The steam pipe may be provided with a heat regulating valve of known construction, which automatically breaks off the supply of steam, when the water circulating through the pump has reached a certain temperature, and opens for the steam when the temperature has sunk to a certain limit. An example of such a construction is illustrated in Fig. 12 wherein $p^2$ indicates a cylinder in which is contained a liquid and which is placed in an outlet pipe of the heating pump $e$. The cylinder $p^2$ is connected through pipe $p^3$ with a flexible tube, for instance of caoutchouc, and cased in a metal spring $p^4$ placed in a metal tube $p^5$ consisting of an upper and lower part; the last one placed telescopically around the first. By means of screw $p^6$ the casing $p^5$ of the flexible tube $p^4$ can be lengthened or shortened. $p^7$ is a steam valve provided with a rod $p^8$ which goes through the upper cover of $p^5$. When the fluid in $p^2$ is heated by the water passing through the outlet pipe of the pump $e$, the fluid of $p^2$ expands and lengthens the flexible casing $p^4$ until it reaches the lower end of the rod $p^8$ and closes the steam valve $p^7$. The inlet of steam in the outlet pipe of the pump $e$ is then stopped and the rise in temperature is discontinued. By lengthening or shortening of the casing $p^5$ by means of the screw $p^6$ it is possible to stop the inlet of steam at any desired temperature of the water.

When the valves $i$ of one or more chambers are opened, the water contained therein is constantly drawn through the pump $e$ and back into the same chambers by way of the collecting pipes, and on its way the water is heated by the addition of steam as above described. The automatic opening and closing of the valves $i$ is effected in the following way:—The shaft $R^1$ of the worm wheel L which is set in motion by the worm K, operated by the shaft of the circulating pump C is extended out and supports a beveled gear wheel S which transmits its motion to the beveled gear wheel $S^1$. On the same shaft as $S^1$ is fastened a common gear wheel $S^2$ which drives another gear wheel $S^3$ and on the shaft carrying the latter wheel $S^3$ is fastened a sprocket wheel T carrying a Gall's chain U. The ratio of gearings are chosen so that the chain advances a distance equal to the length of one of the chambers, during each period of the action of the pump. Two of the chain links are provided each with a projecting pin V striking the arms X of wheels fastened at the end of the spindles of the valves $i$. When one of the pins V passes an arm X the corresponding wheel is by this arrangement caused to make a revolution of 90° and, as the upper end of the pipe Y incasing the valves $i$ is provided with two grooves placed diametrically opposite one another, while the valve stem is provided with a projection $X^1$ resting on the upper end of Y, a turn of 90° of the valve stem will either open or close the valve $i$.

Fig. 7 shows incasing pipe Y, turning wheel X and pin $X^1$, while $X^2$ is a plate having a hole for the passage of the valve stem but otherwise separating the upper and the lower water passages. $X^3$ is another plate serving as a guide for the valve stem. The full lines show the valves closed, while the dotted lines show the valves in their open position. When the first of the striking pins V strikes an arm of the wheel X belonging to a closed set of valves $i$, the said pin will turn the valve stem 90° thereby opening the set of valves, which will rest open until the wheel of this valve is hit by the second pin, the valve stem being thereby again turned 90° and the valves consequently closed.

Supposing the distance between the pins is equal to the width of one chamber, each chamber in succession will stay in connection with the pipe system during one acting period of the pump C, while all the other chambers are disconnected from the pipe system. If the distance between the pins equals the width of two or more chambers, a corresponding number of chambers will be in communication with the pipe system, and their contents of heating medium will be drawn through the pump $e$ and their temperature kept up to the standard by action of the regulator $g$. This group of heated chambers, wherein is contained fluid of maximum temperature, will be advanced one chamber for each period of action of the pump, $i. e.$, each time the pump is put in operation it will operate to cause that portion of the heating medium which is of maximum temperature to be transferred from one chamber, or from the first of a group of chambers, to the next chamber.

It will be understood, that the devices just described and illustrated on the accompanying drawings by way of example, may be modified in numerous manners, without departing from the principle underlying this invention.

What I claim as my invention, and desire to secure by Letters Patent, is—

1. An apparatus for pasteurizing beer and other bottled liquids, comprising a number of fluid containing compartments connected together for circulation of their fluid contents through all of the chambers, a circulating pump for circulating the fluid therethrough *seriatim*, outlet and inlet pipes in connection with each compartment, valves in said pipes, and a pump adapted to circulate fluid through said pipes and the compartments in open communication therewith, whereby a secondary circulation independent of the first circulation can take place through a limited number of the compartments, means for heating the fluid circulated by said second-named pump, and means for automatically opening and closing said valves controlling said outlet and inlet pipes, through which said secondary circulation occurs, said means being controlled by said first named pump.

2. An apparatus for pasteurizing beer and other bottled liquids comprising a number of fluid-containing compartments connected together in series for circulation of their fluid contents, means for separately heating the fluid in each of said compartments, means for producing a circulation of the fluid contents of said compartments throughout the series, and means for automatically stopping the circulation of the water after a certain period of operation of said circulating means.

3. An apparatus for pasteurizing beer and other bottled liquids comprising a continuous series of intercommunicating chambers, through which a heat transmitting medium is adapted to be circulated, a pump inserted in the circuit for producing a circulation of said transmitting medium, valves for admitting an independent heating medium through each compartment, means for automatically opening and closing said valves, and means for automatically stopping the circulation of the heat transmitting medium after a certain pumping period.

4. An apparatus for pasteurizing beer and other bottled liquids comprising a continuous series of intercommunicating compartments, through which a heat transmitting medium is adapted to be circulated, a pump inserted in the circuit for producing a circulation of said transmitting medium, valves for admitting an independent heating medium through each compartment, and means for automatically opening and closing said valves under the influence of the said circulating pump.

5. An apparatus for pasteurizing beer or the like comprising a continuous series of intercommunicating compartments, through which a heat transmitting medium is adapted to be circulated, a pump inserted in the circuit for producing a circulation of said transmitting medium, valves for admitting an independent heating medium through each compartment, means for automatically opening and closing said valves, said means being controlled by the circulating pump, and means for automatically starting the action of the heat source, when the temperature of the heat transmitting medium passing through the pipe system has sunk to a certain limit, and setting it out of action, when the temperature of this medium has reached a certain limit.

6. An apparatus for pasteurizing beer and other bottled liquids comprising a number of fluid-containing compartments connected together in series for circulation of their fluid contents, valves for separately controlling the admission of heating fluid to each of said compartments, means for producing a circulation of the fluid contents of said compartments throughout the series, and means for automatically opening and closing said valves, said means comprising a chain or the like, set in motion by the circulating means and effecting the opening and closing of the heating valves.

7. An apparatus for pasteurizing beer and other bottled liquids comprising a continuous series of intercommunicating chambers, through which a heat transmitting medium is adapted to be circulated, a pump inserted in the circuit for producing a circulation of said transmitting medium, valved means for admitting an independent heating medium through each compartment, means for automatically opening and closing said valves, and means for automatically stopping the circulation of the heat transmitting medium after a certain pumping period, said means comprising a chain or the like, set in motion by the circulating pump and effecting the opening and closing of the heating valves.

8. An apparatus for pasteurizing beer and other bottled liquids comprising a number of fluid-containing compartments connected together in series for circulation of their fluid contents, means for separately heating the fluid in each of said compartments, means for producing a circulation of the fluid contents of said compartments throughout the series, said means comprising a belt-driven pump, fast and loose pulleys, a driving belt and means for automatically shifting the said belt from the fixed pulley to the loose pulley thereby stopping the pump after a certain period of action.

9. An apparatus for pasteurizing beer and other bottled liquids comprising a continuous series of intercommunicating chambers, through which a heat transmitting medium is adapted to be circulated, means for setting said heat transmitting medium in motion, said means comprising a belt-driven pump, fast and loose pulleys, a driving belt, and means for automatically shifting said belt from the fixed pulley to the loose pulley, thereby stopping the pump after a certain period of action, valved heating means in said compartments, and means for automatically opening and closing the heating valves.

In witness whereof, I have hereunto signed my name in the presence of two subscribing witnesses.

NIELS FREDERIK NISSEN.

Witnesses:
JULIUS LEHMANN,
F. SODEMANN.

---

Copies of this patent may be obtained for five cents each, by addressing the "Commissioner of Patents, Washington, D. C."